(12) United States Patent
Kitamura

(10) Patent No.: US 11,809,767 B2
(45) Date of Patent: Nov. 7, 2023

(54) IMAGE PROCESSING APPARATUS, IMAGE PROCESSING METHOD, AND NON-TRANSITORY RECORDING MEDIUM

(71) Applicant: Takashi Kitamura, Kanagawa (JP)

(72) Inventor: Takashi Kitamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/488,517

(22) Filed: Sep. 29, 2021

(65) Prior Publication Data

US 2022/0137904 A1 May 5, 2022

(30) Foreign Application Priority Data

Oct. 29, 2020 (JP) ................................ 2020-181790

(51) Int. Cl.
G06F 3/12 (2006.01)

(52) U.S. Cl.
CPC .......... G06F 3/1263 (2013.01); G06F 3/1203 (2013.01); G06F 3/1253 (2013.01); G06F 3/1284 (2013.01)

(58) Field of Classification Search
CPC .... G06F 3/1263; G06F 3/1203; G06F 3/1253; G06F 3/1284; G06F 3/1247; G06F 3/1252; G06F 3/1285; G06F 3/1211
See application file for complete search history.

(56) References Cited

U.S. PATENT DOCUMENTS

| 2002/0015524 A1* | 2/2002 | Fujiwara | G06V 30/413 382/181 |
| 2002/0016799 A1* | 2/2002 | Nakagiri | G06K 15/00 715/246 |
| 2002/0048476 A1* | 4/2002 | Kato | G06F 3/1261 400/70 |
| 2002/0052897 A1* | 5/2002 | Nishikawa | G06F 3/1204 715/201 |
| 2005/0105116 A1* | 5/2005 | Kobashi | G06F 40/103 358/1.18 |
| 2007/0081182 A1* | 4/2007 | Shiohara | H04N 1/64 358/1.15 |
| 2008/0018952 A1* | 1/2008 | Du | H04N 1/00464 358/468 |
| 2017/0286035 A1* | 10/2017 | Miyahara | G06F 3/1284 |

FOREIGN PATENT DOCUMENTS

JP 2010-103620 5/2010

* cited by examiner

*Primary Examiner* — Huo Long Chen
(74) *Attorney, Agent, or Firm* — Harness, Dickey & Pierce, P.L.C.

(57) ABSTRACT

An image processing apparatus includes a memory and processing circuitry. The memory sequentially stores a plurality of read images read by a reading device. The processing circuitry transfers pairs of read images from the memory to an external apparatus in ascending order of priority in bookbinding to leave pairs of read images in the memory in descending order of priority in bookbinding. The processing circuitry further instructs an image forming device to execute image formation with pairs of read images in descending order of priority in bookbinding.

20 Claims, 9 Drawing Sheets

IMAGE PROCESSING APPARATUS, IMAGE PROCESSING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-181790 filed on Oct. 29, 2020, in the Japan Patent Office, the entire disclosure of which is hereby incorporated by reference herein.

BACKGROUND

Technical Field

The present invention relates to an image processing apparatus, an image processing method, and a non-transitory recording medium.

Description of the Related Art

To make a copy of a book or booklet with a multifunction peripheral (MFP), a user typically operates a scanner of the MFP to read the front cover and the back cover of the book or booklet and then sequentially read the inside pages of the book or booklet such that each two facing pages are read at one time. The MFP stores the read images in a memory in reading order. After having stored the image of the last page, the MFP prints the stored images on a plurality of print sheets by laying out a plurality of images on each of the print sheets in bookbinding order. If the memory is filled with page images during the reading process and one of the plurality of images to be laid out on a print sheet has not been read yet, the MFP is unable to print the images in bookbinding order, and thus cancels a copy job.

In view of the above, there is a technique in which image data stored before the occurrence of the memory full condition and image data read after the occurrence of the memory full condition are transferred to an information processing apparatus connected to the MFP such that the information processing apparatus aggregates and prints the images of the transferred image data.

According to this technique, however, all images are transferred to the information processing apparatus on the occurrence of the memory full condition, extending the waiting time before the start of printing, depending on the communication performance or condition.

SUMMARY

In one embodiment of this invention, there is provided an improved image processing apparatus that includes, for example, a memory and processing circuitry. The memory sequentially stores a plurality of read images read by a reading device. The processing circuitry transfers pairs of read images from the memory to an external apparatus in ascending order of priority in bookbinding to leave pairs of read images in the memory in descending order of priority in bookbinding. The processing circuitry further instructs an image forming device to execute image formation with pairs of read images in descending order of priority in bookbinding.

In one embodiment of this invention, there is provided an improved image processing method that includes, for example, sequentially storing, in a memory, a plurality of read images read by a reading device, transferring pairs of read images from the memory to an external apparatus in ascending information order of priority in bookbinding, after the transfer of the pairs of read images to the external apparatus, storing, in the memory, a subsequent read image read by the reading device, and instructing an image forming device to execute image formation with pairs of read images in descending order of priority in bookbinding.

In one embodiment of this invention, there is provided a non-transitory recording medium storing a plurality of instructions which, when executed by one or more processors, cause the processors to perform the above-described image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
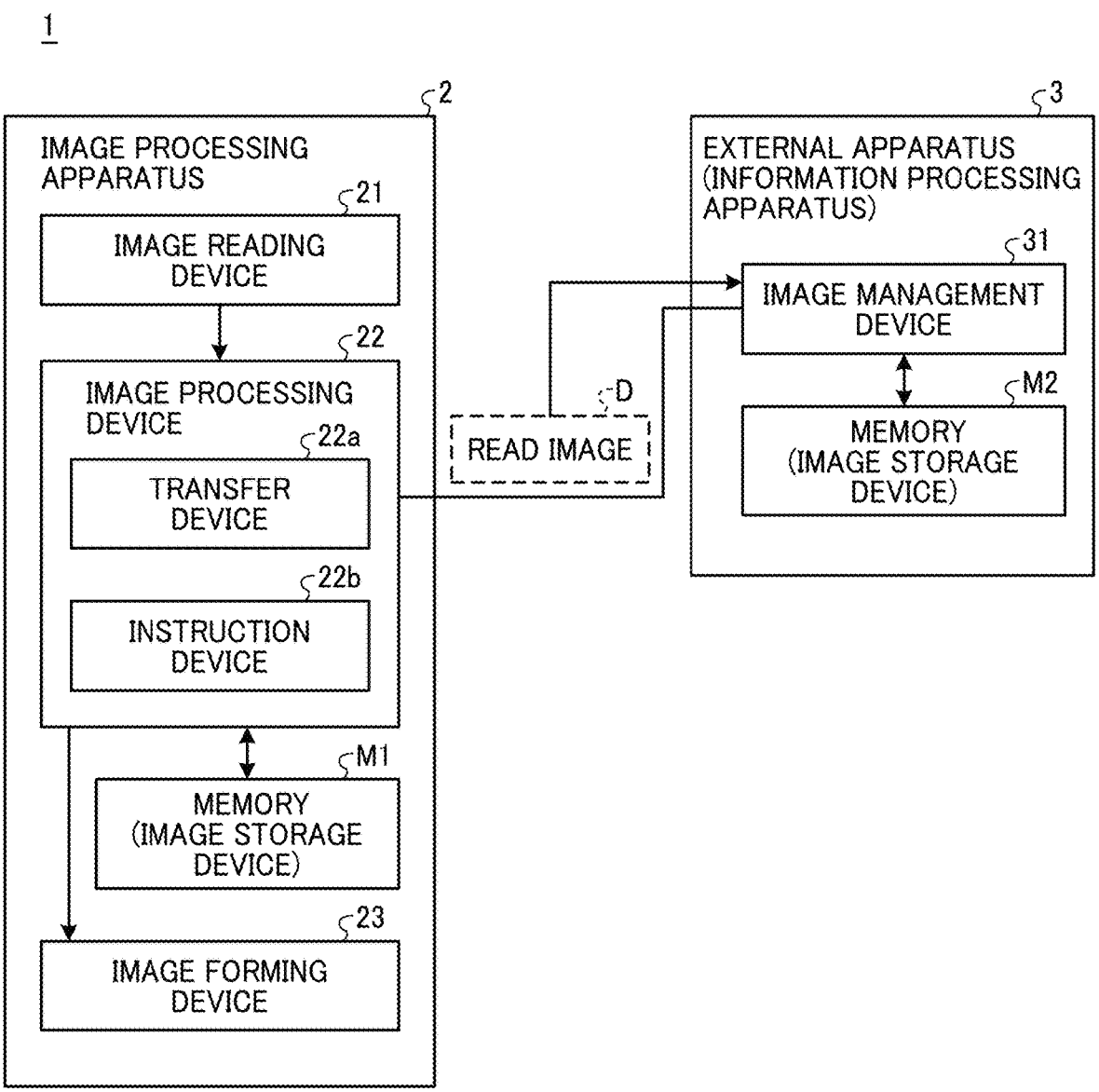
FIG. 1 is a diagram illustrating an example of the general arrangement of an image processing system including an image processing apparatus of an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An image processing apparatus, an image processing method, and a non-transitory recording medium according to an embodiment of the present invention will be described in detail below with reference to the accompanying drawings. In the following description, wording such as "rearrange read images," "combine read images," "lay out read images," or "aggregate read images" means associating the read images with each other in bookbinding order.

FIG. 1 is a diagram illustrating an example of the general arrangement of an image processing system including an image processing apparatus of the embodiment. An image processing system 1 illustrated in FIG. 1 includes an image processing apparatus 2 and an external apparatus 3. The image processing apparatus 2 is communicably connected to the external apparatus 3 via a communication device. The external apparatus 3 may be an information processing apparatus such as a desktop or laptop personal computer (PC) connected to the image processing apparatus 2 in peer-to-peer fashion, or may be an information processing apparatus such as a management server to which the image processing apparatus 2 is connectable via a communication network such as a local area network (LAN) or the Internet. The external apparatus 3 may also be a cloud computing system. Further, the external apparatus 3 may be provided to be connectable to the image processing apparatus 2, or may be included in another image processing apparatus.

The image processing apparatus 2 includes an image reading device 21, an image processing device 22 (an example of processing circuitry), and an image forming device 23. The image reading device 21 is implemented by a later-described scanner, for example. The image processing device 22 is implemented by a later-described central processing unit (CPU) and application specific integrated circuit (ASIC), for example. The image forming device 23 is implemented by a later-described engine, for example.

The image processing device 22 includes a transfer device 22a that performs a later-described transfer process and an instruction device 22b that instructs the image forming device 23 to perform image formation. In the image processing apparatus 2, read images read by the image reading device 21 are stored in a memory M1 serving as a storage device, and are subjected to a process according to print settings, such as an aggregation process, based on an instruction from the instruction device 22b. The processed images are then output to the image forming device 23 to be printed therein. If the image processing apparatus 2 is unable to execute part or all of the above-described processes owing to the lack of processing capacity, the transfer device 22a transfers a read image D to an external apparatus from the memory M1 in accordance with a particular transfer rule so that an unfinished part of the processes is executed in the external apparatus. Herein, the external apparatus may be the external apparatus 3 or a portable recording medium such as a universal serial bus (USB) memory, for example. In the following description, the external apparatus 3 will be described as an example of the external apparatus.

If the memory M1 becomes full because of the specifications or the processing state of the image processing apparatus 2 when the setting for bookbinding printing is selected, for example, the memory M1 is unable to store subsequent read images. In this case, the process of combining read images in bookbinding order is inexecutable with the stored read images (i.e., the read images stored in the memory M1) alone, and thus results in an error. The image processing device 22 therefore performs the transfer process by determining, for each read image, whether to leave the read image in the memory M1 or transfer the read image to the external apparatus 3 based on the particular transfer rule. According to the particular transfer rule, the image processing apparatus 2 leaves the read image in the memory M1 when the read image is given a high priority in bookbinding order, and transfers the read image to the external apparatus 3 as the read image D when the read image is given a low priority in bookbinding order. Thus transferring the read image of low priority in bookbinding order to the external apparatus 3 as the read image D, the image processing apparatus 2 promptly starts printing the read image of high priority in bookbinding order.

The image reading device 21 (i.e., a reading device) is a scanner. The image forming device 23 forms and outputs an image on a recording sheet (e.g., a print sheet). In the present example of the embodiment, the image processing apparatus 2 includes both the image reading device 21 and the image forming device 23. Alternatively, the image reading device 21 may be an image reading apparatus communicably connected to the image processing apparatus 2, and the image forming device 23 may be an image forming apparatus communicably connected to the image processing apparatus 2.

The external apparatus 3 includes an image management device 31 in which the read images D transferred from the image processing apparatus 2 are managed in order of priority in bookbinding. The external apparatus 3 may hold the read images D in a memory M2 of the external apparatus 3, or may distribute the read images D to external devices such as external storage devices and manage the distribution destinations in the image management device 31.

The transfer process performed by the image processing device 22 will be described in more detail.

The image processing device 22 stores the read images in the memory M1 in order of reading by the image reading device 21. The image processing device 22 then outputs the read images stored in reading order to the image forming device 23 by combining the read images in order of pages in bookbinding. If the memory M1 becomes full during this process, for example, the image processing device 22 leaves read images of high priority in bookbinding order in the memory M1 and transfers read images of low priority in bookbinding order to the external apparatus 3, and the image forming device 23 starts bookbinding printing.

The transfer rule will be described with reference to FIGS. 2A to 2C.

Figures 2A, 2B, 2C:
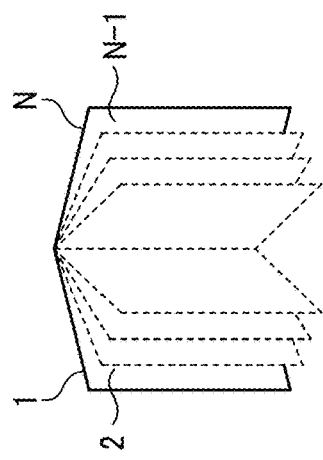
FIGS. 2A to 2C are diagrams illustrating a transfer process performed by an image processing device of the image processing apparatus of the embodiment.

FIGS. 2A to 2C are diagrams illustrating the transfer process performed by the image processing device 22. For example, there is a bookbinding method of stacking sheets printed print sheets) and binding the stacked sheets at the center thereof, as illustrated in FIG. 2A. In this bookbinding method, the image layout and the printing order are different between left to right, right to left, bottom to top, and top to bottom turning styles. Although the left to right turning style will be described below as an example of the page turning style, the transfer process is similarly applicable to the other page turning styles with appropriate changes in the image layout and the printing order.

In the example of a left-to-right turning booklet illustrated in FIG. 2A, if the front cover and the back cover of the booklet are counted as pages of the booklet, the first page corresponds to the front cover, the second page corresponds to the left side of a two-page sheet on the back of the first page, and the third page corresponds to the right side of the two-page sheet. With the pages of the booklet thus sequentially turned, the N-th page of the closed booklet corresponds to the back cover of the booklet. To make a copy of the booklet with the setting for left-to-right bookbinding, a user uses the scanner of the image processing apparatus 2 to first read the N-th page corresponding to the back cover of the booklet and then the first page corresponding to the front cover of the booklet. The user continues the reading operation by turning the pages and causing the scanner to sequentially read the subsequent pages, i.e., the second page, the third page, and so forth, until the (N−1)-th page.

With the pages of the booklet read in accordance with this procedure, the read images are sequentially stored in the memory M1 in the reading order illustrated in FIG. 2B, i.e., in the order of the N-th page, the first page, the second page, the third page, . . . , and the (N−1)-th page. If the processing capacity of the image processing apparatus 2 such as the memory capacity thereof is insufficient, there is an increasing possibility that the memory M1 will be unable to hold the read images of all pages of the booklet, causing the memory full condition during the process of reading the pages of the booklet. The arrangement of the read images in reading order is different from the arrangement of the read images in bookbinding order. If the memory full condition occurs during the reading process, therefore, target images (i.e., a pair of read images) combined in bookbinding order fail to be obtained from the memory M1, in which the read images are stored in reading order. Consequently, the image processing apparatus 2 is unable to execute the bookbinding printing process, resulting in the cancellation of a copy job and the retry from the reading process. In the present embodiment, however, the read images (i.e., pairs of read images) stored in the memory M1 are transferred to the external apparatus 3 in accordance with the transfer rule described below to fill the memory M1 with pairs of read images of high priority in bookbinding order. Even if the memory full condition occurs, therefore, the image processing apparatus 2 is able to store the subsequent read images without retrying the reading process and start the bookbinding printing with the pairs of read images of high priority in bookbinding order.

In the bookbinding method as illustrated in FIG. 2A, the read image of the first read N-th page and the read image of the next read first page are laid out on the left and right sides, respectively, of the front surface of a print sheet. Further, the read image of the second page read after the first page and the read image of the last read (N−1)-th page are laid out on the left and right sides, respectively, of the rear surface of the print sheet. In bookbinding order, these read images are laid out on the first print sheet, and thus are given the highest priority. The next priority is sequentially given to the read images to be laid out on the second print sheet, the read images to be laid out on the third print sheet, and so forth. For each of the print sheets following the first print sheet, the combination of read images to be laid out on the print sheet is determined by a logic similar to that applied to the first print sheet, as illustrated in FIG. 2C.

For the image processing apparatus 2 to complete printing on the first print sheet in this bookbinding example, the read images of four pages, i.e., the N-th page, the first page, the second page, and the (N−1)-th page, should be stored in the memory M1. In reading order, the image of the (N−1)-th page (i.e., one of the target images) is read last. An increase in the number of pages of the booklet, therefore, increases the possibility that the memory full condition occurs during the reading process, causing a failure to store the read images including the read image of the (N−1)-th page in the memory M1. As understood from the comparison between the arrangement of the read images in reading order in FIG. 2B and the arrangement of the read images in bookbinding order in FIG. 2C, this possibility is not limited to the printing on the first print sheet but is also recognized in the printing on the second and subsequent print sheets.

In view of the above, the image processing device 22 transfers pairs of read images D of low priority in bookbinding order to the external apparatus 3 from the memory M1 such that the read images of 4X pages are left in the memory M1 in order of priority in bookbinding, to thereby fill the memory M1 with pairs of read images of high priority in bookbinding order, which include an image read later in the reading process. Herein, X represents an available print count, which is the number of print sheets on which the image processing apparatus 2 is able to execute printing with the read images stored in the memory M1. The available print count X is a positive integer obtained by rounding the result of dividing a read page count K, which represents the number of read images of pages stored in the memory M1 before the occurrence of the memory full condition, by the number of pages to be combined (i.e., laid out) on each print sheet (four in the present example).

According to the above-described transfer rule, there are the following two patterns of the transfer process, for example.

When the read page count K is equal to or less than 3, the available print count X is 0. In this case, the image processing apparatus 2 is incapable of completing the printing on one print sheet, and thus transfers all read images to the external apparatus 3. That is, the image processing device 22 transfers all read images stored in the memory M1 to the external apparatus 3, and also transfers to the external apparatus 3 all read images read after the read images stored in the memory M1, to thereby cause the external apparatus 3 to execute the left-to-right bookbinding printing.

When the read page count K is equal to or greater than 4, the available print count X is equal to or greater than 1. In this case, the image processing apparatus 2 is capable of completing the printing on X print sheets. The image processing device 22 therefore determines the read images D to be transferred to the external apparatus 3 such that the read images for the X print sheets are left in the memory M1 in bookbinding order. For example, the image processing device 22 determines the read images D to be transferred to the external apparatus 3 in accordance with the following transfer rule, and transfers the thus-determined read images D to the external apparatus 3.

The image processing device 22 first transfers the (2X+2)-th to K-(2K−2)-th read images stored in the memory M1 to the external apparatus 3. The image processing device 22 then sequentially updates the memory M1, which now has space freed by the above-described transfer, with the subsequent read images to fill the memory M1 with the read images for the X print sheets (i.e., the read images of the 4X pages). If there are further subsequent read images, the image processing device 22 repeats a similar operation of transferring the read images stored in the memory M1 to the external apparatus 3 and filling the freed space of the memory M1 with the read images of the 4X pages. For example, after having filled the memory M1 with the read images of the 4X pages, the image processing device 22 determines whether there are subsequent read images, if there are subsequent read images, the image processing device 22 transfers the read images stored in the memory M1, i.e., the react images up to the (2X−1)-th to last read image, to the external apparatus 3, and sequentially fills the space freed on the memory M1 by the this transfer with the subsequent read images.

The image processing device 22 sequentially lays out the read images of the 4X pages left in the image processing apparatus 2 on the X print sheets such that four read images are laid out on each of the X print sheets in bookbinding order. Then, the image forming device 23 performs printing on the X print sheets in bookbinding order. That is, the image forming device 23 sequentially performs printing on the first print sheet, the second print sheet, . . . , and the X-th print sheet. As for the read images D transferred to the external apparatus 3, the image processing device 22 causes the external apparatus 3 to lay out the read images D on the print sheets following the X print sheets in the image processing apparatus 2 in bookbinding order, and to sequentially perform printing on the (X+1)-th print sheet, the (X+2)-th print sheet, . . . , and the N/4-th print sheet. Herein, the N/4-th print sheet corresponds to the last inside page in bookbinding order.

As described above, if the memory full condition occurs during the reading of the (K+1)-th page when the image processing apparatus 2 does not have the processing capacity to make a copy of the entire booklet, the image processing apparatus 2 executes the printing on the X print sheets (i.e., the print sheets up to the X-th print sheet) including the printing of the front and back covers. The image processing apparatus 2 further transfers the read images for the (X+1)-th to N/4-th print sheets to the external apparatus 3 to execute the printing on the (X+1)-th and subsequent print sheets in the external apparatus 3. The image processing apparatus 2 is thus capable of causing the external apparatus 3 to process or temporarily hold the read images unprocessable with the processing capacity of the image processing apparatus 2. The read images processable with the processing capacity of the image processing apparatus 2 are printable in the image processing apparatus 2. The read images transferred to the external apparatus 3 are therefore limited to those unprocessable with the processing capacity of the image processing apparatus 2, contributing to a reduction in the amount of data transferred to the external apparatus 3. Further, the image processing apparatus 2 is capable of storing the read images of high priority in bookbinding order within the processing capacity thereof, and thus is capable of promptly starting the bookbinding printing on the first print sheet.

Figure 3:
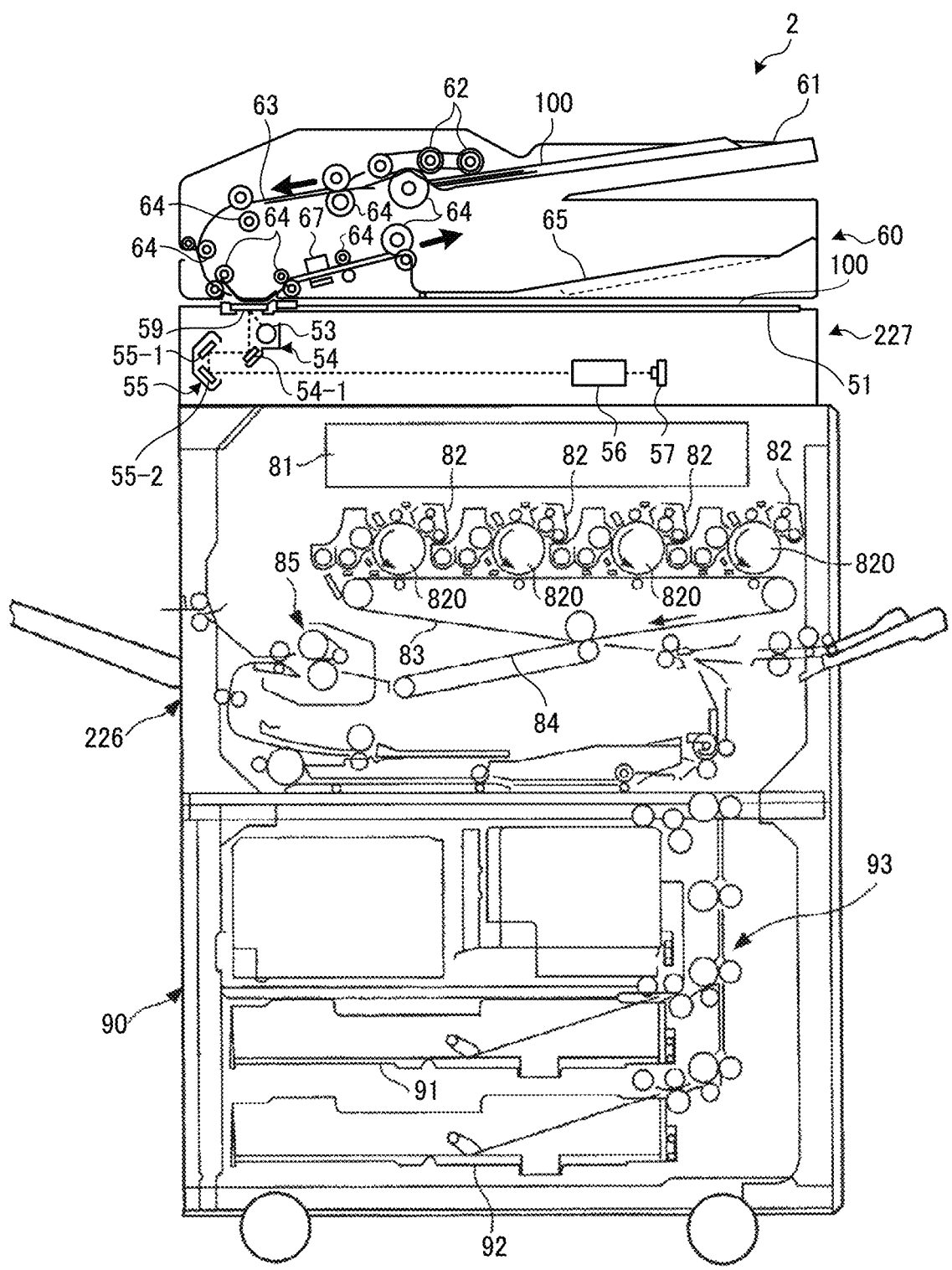
FIG. 3 is a diagram illustrating a configuration example of the image processing apparatus of the embodiment.

FIG. 3 is a diagram illustrating a configuration example of the image processing apparatus 2. The image processing apparatus 2 illustrated in FIG. 3 is an apparatus commonly called multifunction peripheral (MFP) with at least two functions of a copier function, a printer function, a scanner function, and a facsimile (FAX) function. FIG. 3 illustrates an external view and an internal configuration of an MFP including the image reading device 21 and the image forming device 23 (see FIG. 1) as an example of the image processing apparatus 2 of the embodiment.

As illustrated in FIG. 3, the image processing apparatus 2 includes a scanner 227 and an automatic document feeder (ADF) 60, which form the image reading device 21, The image processing apparatus 2 further includes an engine 226 and a sheet feeding device 90, which form the image forming device 23. The image processing apparatus 2 also includes a control hoard in the scanner 227, for example, to control the overall operation of the image processing apparatus 2.

The scanner 227 has a contact glass 51 on an upper surface thereof. The scanner 227 further includes therein a reading device that reads the image of a reading target on the contact glass 51 with a light source 53, a first carriage 54, a second carriage 55, a lens unit 56, and a sensor board 57, for example. In FIG. 3, the first carriage 54 includes the light source 53 and a reflecting mirror 54-1, and the second carriage 55 includes reflecting mirrors 55-1 and 55-2.

The scanner 227 irradiates the reading target with light from the light source 53. The light reflected from the reading target is reflected by the mirror 54-1 of the first carriage 54 and the mirrors 55-1 and 55-2 of the second carriage 55 to be incident on the lens unit 56. The scanner 227 then reads the image of the reading target formed on a light receiving surface of the sensor board 57 with the light from the lens unit 56, The sensor board 57 includes line sensors including charge coupled device (CCD) elements or complementary metal-oxide semiconductor (CMOS) elements, for example. Images of the reading target formed on light receiving surfaces of the line sensors are sequentially converted into electric signals to read the image of the reading target.

The image processing apparatus 2 in the present example reads the reading target with a flat bed system in which the reading target is read on a flat bed (the contact glass 51 in the present example). The reading target is each of pages of a bound book or booklet or a stack of pages cut and separated from a book or booklet, for example. In the following description, each of these pages will be collectively referred to as the document.

In the reading with the flat bed system, a user lifts the ADF 60 to expose the contact glass 51, and directly places a document 100 on the contact glass 51. The user then brings the ADF 60 down to the original position thereof to hold the rear surface of the document 100 with a lower side of the ADF 60. In the flat bed system, in which the document 100 is fixedly held, the two carriages, i.e., the first carriage 54 and the second carriage 55, are moved relative to the document 100 to scan the document 100. Each of the first carriage 54 and the second carriage 55 is driven by a scanner motor to scan the document 100 in the sub-scanning direction. For example, the first carriage 54 moves at a speed and the second carriage 55 simultaneously moves at a speed ½V, i.e., at half the speed of the first carriage 54, in coordination with the first carriage 54. Thereby, a first surface (i.e., a surface facing the contact glass 51) of the document 100 is read.

In the image processing apparatus 2 including the ADF 60, the document 100 or a stack of documents 100 may be set on and automatically fed by the ADF 60 to read the image of each document 100.

In the ADF 60, the documents 100 are transported one by one from the stack of documents 100 on a tray 61 to a transport path 63 by pickup rollers 62, and a surface of each document 100 as the reading target is read at a predetermined position. Then, the document 100 is ejected onto a sheet ejection tray 65. The document 100 is transported by the rotation of various transport rollers 64.

The document 100 is read when passing a reading window 59 with the first carriage 54 and the second carriage 55 moved to and held at respective predetermined home positions by the image processing apparatus 2, for example. The reading window 59 has a slip shape and is formed in a part of the contact glass 51. The automatically fed document 100 passes the reading window 59 to be scanned in the sub-scanning direction. In the image processing apparatus 2, while the document 100 passes the reading window 59, the line sensors on the sensor board 57 sequentially read the reflected light from the front surface (i.e., a surface facing the reading window 59) of the document 100 irradiated with the light from the light source 53.

To read both the front surface and the rear surface of the document 100, the rear surface of the document 100 is read by a reading module 67 after the document 100 passes the reading window 59. The reading module 67 includes an irradiation device and a contact-type image sensor. With the contact-type image sensor, the reading module 67 reads the reflected light from the rear surface of the document 100 irradiated with the light.

The image processing apparatus 2 performs image processing on the read image read by the scanner 227, and prints the processed image on a recording sheet in the engine 226.

Specifically, the engine 226 includes an optical writing device 81, a tandem image forming unit including four image forming units 82 for forming yellow (Y), magenta (M), cyan (C), and black (K) images, an intermediate transfer belt 83, and a second transfer belt 84, for example. In the engine 226, the optical writing device 81 writes images on four photoconductor drums 820 in the four image forming units 82 based on the images subjected to the image processing, and toner images are first-transferred from the respective photoconductor drums 820 onto the intermediate transfer belt 83.

In the example illustrated in FIG. 3, the four image forming units 82 corresponding to the Y, M, C, and K colors include the four rotatable photoconductor drums 820 corresponding to the Y, M, C, and K colors. Each of the image forming units 82 includes image forming components such as a charging roller, a developing device, a first transfer roller, a cleaning device, and a discharger, which are disposed around the corresponding photoconductor drum 820. With the image forming components operating around the photoconductor drum 820 in a particular image forming process, the image is formed on the photoconductor drum 820. Then, with the first transfer roller, the image formed on the photoconductor drum 820 is first-transferred onto the intermediate transfer belt 83 as the toner image.

The intermediate transfer belt 83 is stretched by a drive roller and a driven roller to be disposed in respective nips formed between the photoconductor drums 820 and the first transfer rollers. With the rotation of the intermediate transfer belt 83, the toner images first-transferred to the intermediate transfer belt 83 are second-transferred onto the recording sheet on the second transfer belt 84 in a second transfer device. With the rotation of the second transfer belt 84, the recording sheet is transported to a fixing device 85, in which the toner images on the recording sheet are fixed thereon as a color image. The recording sheet is then ejected to the outside of the image processing apparatus 2 onto a sheet ejection tray.

The recording sheet is fed by the sheet feeding device 90 from one of sheet feeding cassettes 91 and 92 that store recording sheets of different sheet sizes, for example. Then, with a transport device 93 including various rollers, the recording sheet is transported and supplied onto the second transfer belt 84.

The engine 226 does not necessarily form the image in accordance with the above-described electrophotographic method, and may form the image in accordance with the inkjet method.

Figure 4:
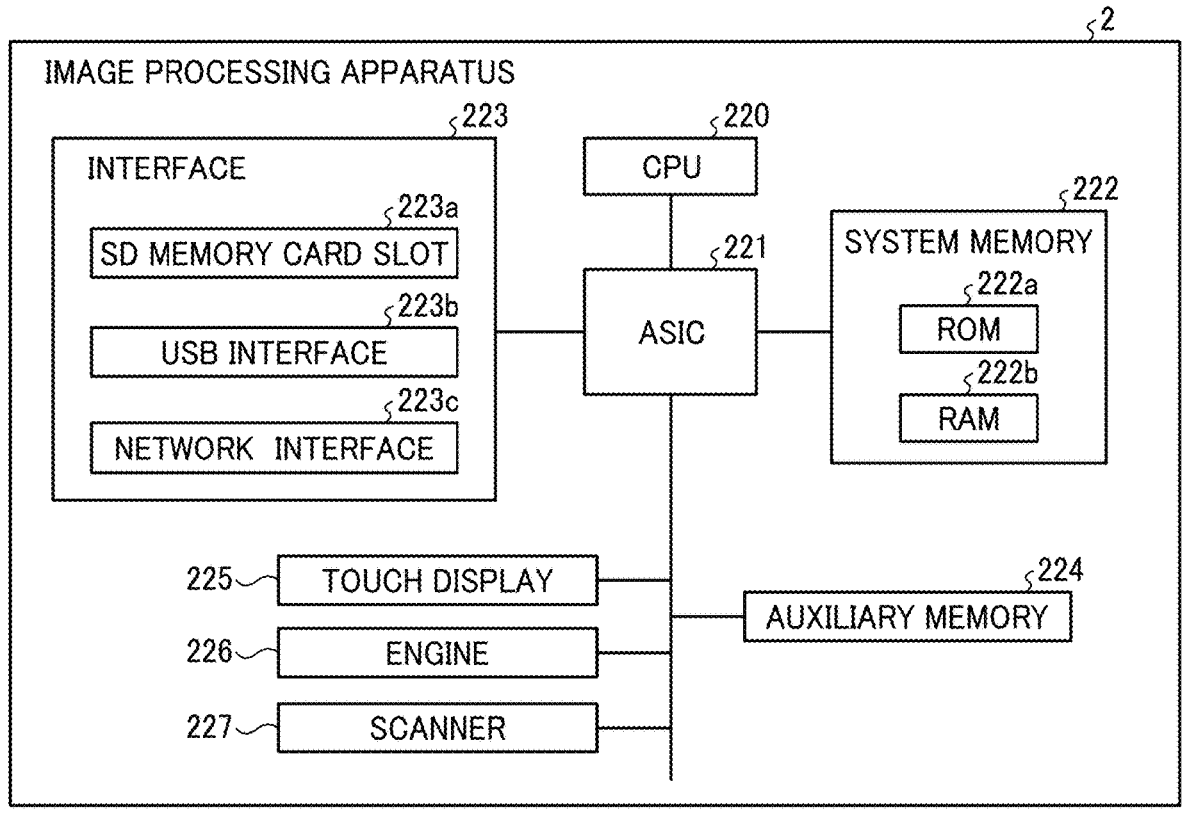
FIG. 4 is a diagram illustrating a configuration example of a control block of the image processing apparatus of the embodiment.

FIG. 4 is a diagram illustrating a configuration example of a control block of the image processing apparatus 2. As illustrated in FIG. 4, the image processing apparatus 2 includes a CPU 220, an ASIC 221, a system memory 222, an interface 223, an auxiliary memory 224, a touch display 225, the engine 226, and the scanner 227. The system memory 222 includes a read only memory (ROM) 222a and a random access memory (RAM) 222b. The interface 223 includes a secure digital (SD, registered trademark) memory card slot 223a, a USB interface 223b, and a network interface 223c.

Using a particular area of the RAM 222b as a work area, the CPU 220 executes various processes in cooperation with various control programs previously stored in the ROM 222a or the auxiliary memory 224, to thereby perform the overall control of the operation of the entire image processing apparatus 2.

The ASIC 221 is an integrated circuit (IC) for image processing, which includes hardware components for image processing. The ASIC 221 functions as a bridge that connects the CPU 220 to each of the other components.

The ROM 222a is a read only memory for storing fixed programs and fixed data. The RAM 222b is a readable and writable volatile memory used in deploying programs and data or in printer rendering, for example.

The interface 223 is an interface for detachably connecting the image processing apparatus 2 to an external device. The SD memory card slot 223a illustrated in FIG. 4 as an exemplary component of the interface 223 is used to detachably connect the image processing apparatus 2 to an SD memory card as an external storage device. The USB interface 223b is used to detachably connect the image processing apparatus 2 to a USB flash memory as an external storage device.

The interface 223 further includes an interface for connecting the image processing apparatus 2 to a network for connecting to the external apparatus 3. The network interface 223c illustrated in FIG. 4, which is a network card, for example, connects the image processing apparatus 2 to the network.

The auxiliary memory 224 includes a storage (i.e., recording) medium for magnetic, electric, or optical writing and reading. For example, a hard disk drive (HDD) is an auxiliary memory including a magnetic recording medium. The auxiliary memory 224 rewritably stores programs for various control operations of the image processing apparatus 2.

The touch display 225 is a user interface for the user to interactively perform an operation such as a print setting operation on the image processing apparatus 2. The touch display 225 includes a display device such as a liquid crystal display and an input device including a touch panel and key switches, for example. Under the control of the CPU 220, the touch display 225 displays, on a screen of the display device, information about the operation of the image processing apparatus 2, the conditions of the image processing apparatus 2 such as the print settings, and operation procedures, for example. Further, in response to detection of user input via the touch panel or the key switches, the touch display 225 outputs the information of the input to the CPU 220.

The engine 226 is an engine of the image forming device 23. The engine 226 includes, as well as an engine section including a plotter, an image processing section that performs processes such as error diffusion and gamma conversion.

The scanner 227 includes line sensors including CCD photoelectric conversion elements, an analog-to-digital (A/D) converter that converts analog read signals into digital signals, and drive circuits that drive the line sensors and the A/D converter. The scanner 227 scans the reading target with the line sensors. Then, based on analog shading information read from the document by the CCD photoelectric conversion elements, the scanner 227 generates 8-bit digital image data (i.e., read image) for each of red (R), green (G), and blue (B) colors. The scanner 227 then outputs the generated image data to the CPU 220.

Figure 5:
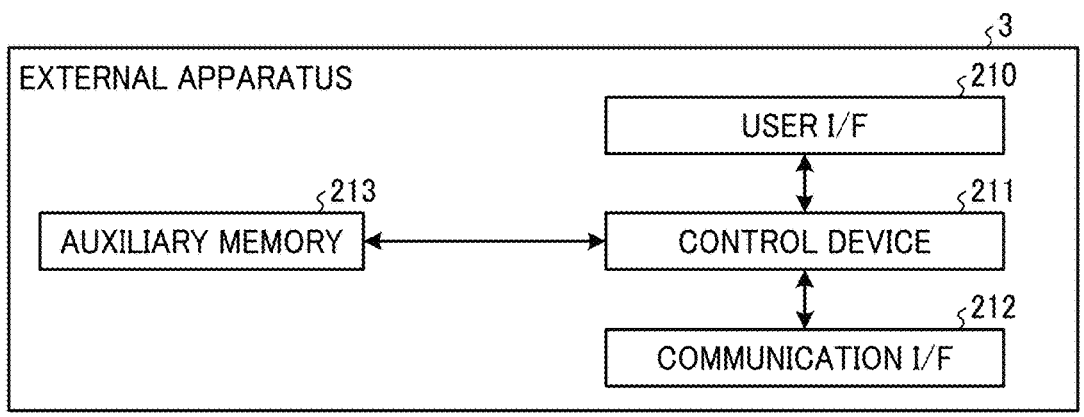
FIG. 5 is a diagram illustrating an example of the hardware configuration of an external apparatus included in the image processing system of the embodiment.

FIG. 5 is a diagram illustrating an example of the hardware configuration of the external apparatus 3. The external apparatus 3 illustrated in FIG. 5 includes a user interface (I/F) 210, a control device 211, a communication I/F 212, and an auxiliary memory 213.

The user I/F 210 is connected to a display such as a liquid crystal display and a keyboard, for example, to receive input of a command or data from the user and output data for display, for example.

The control device 211 is configured as a computer including a CPU, a ROM, and a RAM. The control device 211 executes a particular control program to perform the overall control of the operation of the entire external apparatus 3. The control device 211 further executes a management program to implement the image management device 31 (see FIG. 1) as a functional unit, to thereby manage the read images in bookbinding order with a management table, for example.

The communication I/F 212 is a network interface controller (NIC) that controls the connection of the external apparatus 3 to a network including the image processing apparatus 2.

The auxiliary memory 213, which is an HDD or a flash memory, for example, stores data such as the read images.

The transfer process of the embodiment will be described with FIGS. 6A to 6D.

FIGS. 6A to 6D are diagrams illustrating a process performed by the CPU 220 of the embodiment on a booklet with N pages, in which N is 12 (i.e., the last page of the booklet is the twelfth page). An explanation similar to the foregoing one applies to the process in this case.

Figure 6A:
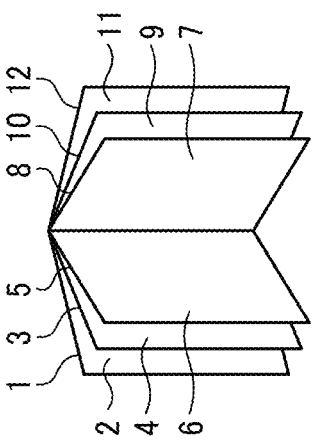
FIGS. 6A to 6D are diagrams illustrating a process performed by a central processing unit (CPU) of the image processing apparatus of the embodiment on a booklet with N pages, in which N is 12.

As illustrated in FIG. 6A, in the example of the left-to-right bookbinding, the read image of the first read twelfth page and the read image of the next read first page are laid out on the left and right sides, respectively, of the front surface of a print sheet. Further, the read image of the second page read after the first page and the read image of the last read eleventh page are laid out on the left and right sides, respectively, of the rear surface of the print sheet. That is, for the image processing apparatus 2 to complete printing on one print sheet in this bookbinding example, the read images of four pages, i.e., the twelfth page, the first page, the second page, and the eleventh page, should be stored in the memory M1.

Figure 6B:
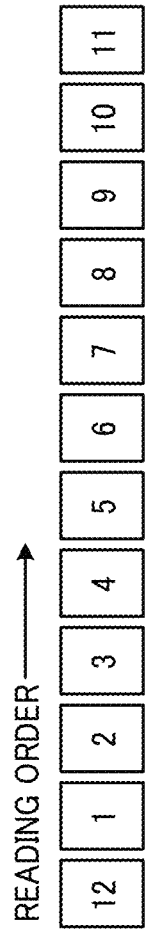

FIG. 6B illustrates an example of the reading order. The following description will be given of this example in FIG. 6B, in which the reading order is: the twelfth page, the first page, the second page, . . . , the tenth page, and the eleventh page.

When the available print count X is 0, the image processing apparatus 2 is incapable of completing the printing on one print sheet, and thus transfers all read images to the external apparatus 3. That is, the external apparatus 3 executes the left-to-right bookbinding printing of the first to twelfth pages.

When the available print count X is 1, the read page count K is 4, 5, 6, or 7. In this case, the image processing apparatus 2 is capable of completing the printing on one print sheet. The CPU 220 of the image processing apparatus 2 therefore determines the read images D to be transferred to the external apparatus 3 such that the read images of four pages are left in the memory M1 in bookbinding order.

The CPU 220 first transfers the fourth to K-th read images stored in the memory M1 to the external apparatus 3. That is, the CPU 220 transfers to the external apparatus 3 the read images other than the first to third read images, i.e., the read images of the twelfth page, the first page, and the second page.

Figure 6C:
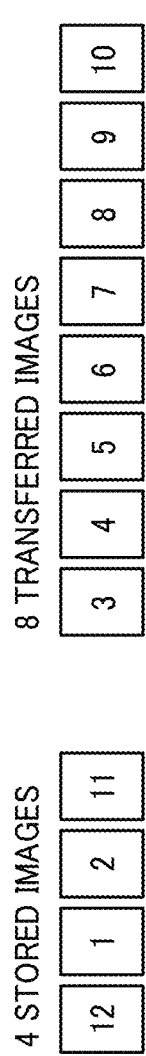

The CPU 220 then fills the space freed on the memory M1 by this transfer with a subsequent read image. Then, if there is another subsequent read image, the CPU 220 transfers the immediately preceding read image used to fill the free space on the memory M1 to the external apparatus 3, and fills the resultant free space of the memory M1 with the another subsequent read image. With this operation being repeated, the freed space of memory M1 is eventually filled with the read image of the eleventh page. In this case, the read images of eight pages are transferred to the external apparatus 3, as illustrated in FIG. 6C.

The CPU 220 then lays out the read images of the four pages left in the memory M1 (i.e., the twelfth page, the first page, the second page, and the eleventh page) on the first print sheet in bookbinding order, and executes the printing on the first print sheet. As for the read images D transferred to the external apparatus 3, the CPU 220 causes the external apparatus 3 to lay out the read images D on the print sheets following the first print sheet in the image processing apparatus 2 in bookbinding order, i.e., on the second and third print sheets, and to execute printing on the second and third print sheets.

When the available print count X is 2, the read page count K is 8, 9, 10, or 11. In this case, the image processing apparatus 2 is capable of completing the printing on two print sheets. The CPU 220 therefore determines the read images D to be transferred to the external apparatus 3 such that the read images of eight pages are left in the memory M1 in bookbinding order.

The CPU 220 first transfers the sixth to (K−2)-th read images stored in the memory M1 to the external apparatus 3.

Figure 6D:
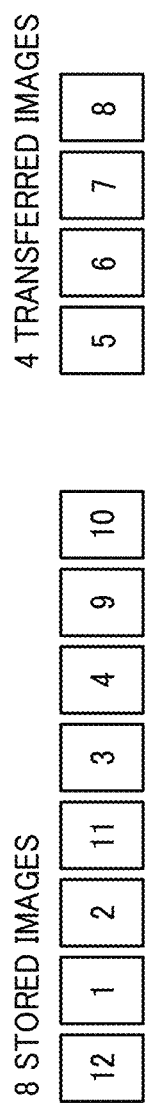

The CPU 220 then fills the space freed on the memory M1 by this transfer with subsequent read image such that eight read images are stored in the memory M1. Then, if there is another subsequent read image, the CPU 220 transfers the third to last read image used to fill the free space on the memory M1 to the external apparatus 3, and fills the resultant free space of the memory M1 with the another subsequent read image. With this operation being repeated, the read images of the twelfth page, the first page, the second page, the eleventh page, the third page, the fourth page, the ninth page, and the tenth page are eventually left in the memory M1 in bookbinding order, and the read images of the other four pages (i.e., the fifth to eighth pages) are transferred to the external apparatus 3, as illustrated in FIG. 6D.

The CPU 220 then lays out the read images of the eight pages left in the memory M1 on the first print sheet and the second print sheet in bookbinding order such that the reading images of four pages are laid out on each of the first and second print sheets. Then, the CPU 220 sequentially executes printing on the first print sheet and the second print sheet. In the present example, the read images of the twelfth page, the first page, the second page, and the eleventh page are laid out on the first print sheet, and the read images of the third page, the fourth page, the nineth page, and the tenth page are laid out on the second print sheet. Then, the printing is sequentially executed on the first print sheet and the second print sheet.

A description will be given of a procedure of the image transfer process performed by the CPU 220.

For example, it is assumed here that the user selects the setting for bookbinding printing on the image processing apparatus 2, places a booklet on the contact glass 51 as the reading target, and operates a reading execution button of the image processing apparatus 2. In response to this user operation, the CPU 220 performs a particular operation to execute the bookbinding printing by storing the read images of the pages of the booklet in the memory M1.

Figure 7:
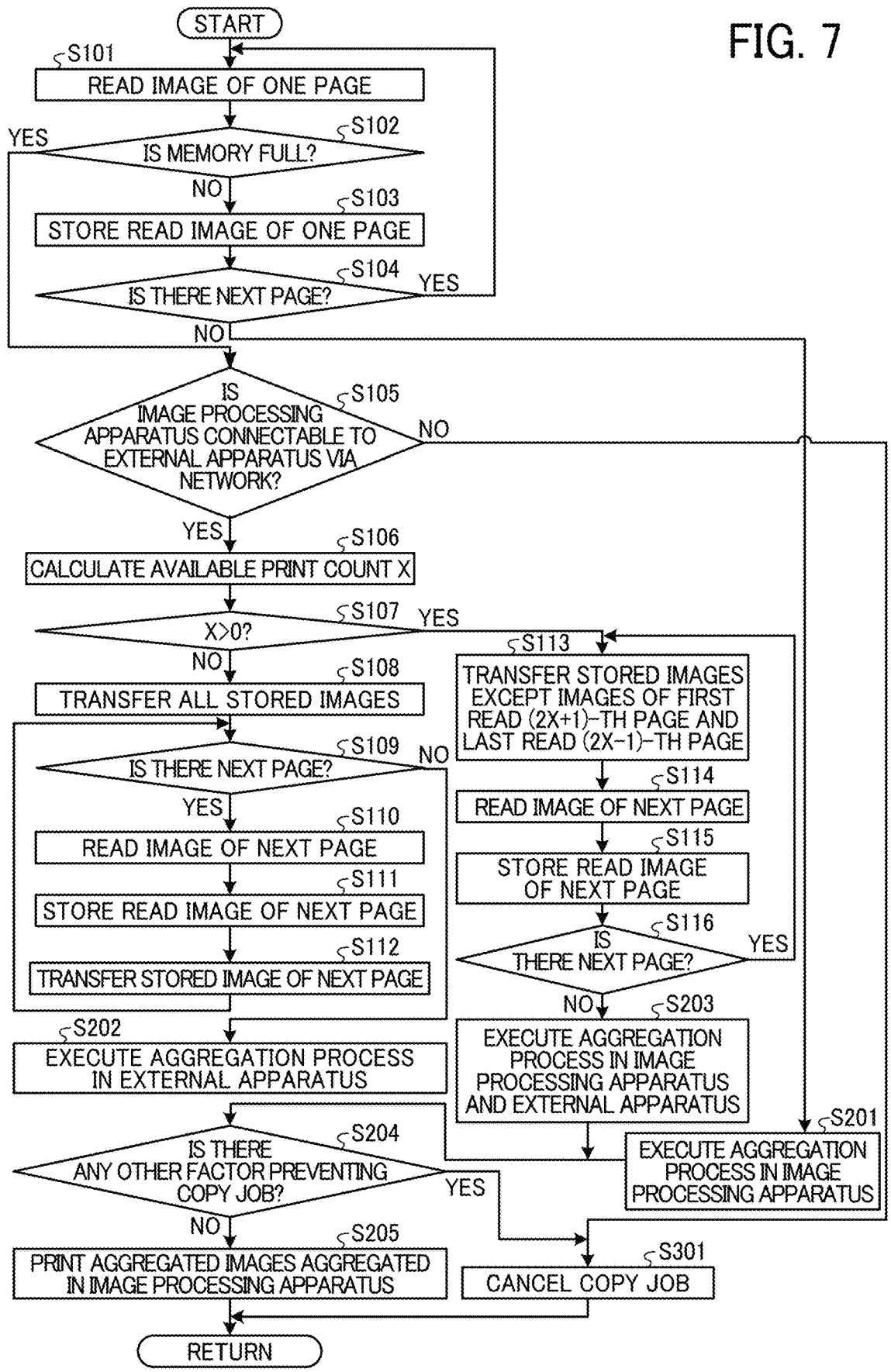
FIG. 7 is a flowchart illustrating an example of the process performed by the CPU of the image processing apparatus of the embodiment.

FIG. 7 is a flowchart illustrating an example of the process performed by the CPU 220. It is assumed in the following description of the procedure of FIG. 7 that the booklet is read in accordance with the procedure described above with FIG. 2A.

The CPU 220 first controls the image reading device 21 to read the image of a page of the booklet (step S101). The first reading target is the N-th page, i.e., the back cover, of the booklet.

The CPU 220 then determines whether the memory M1 is full (step S102). If it is determined that the memory M1 is not full (NO at step S102), the CPU 220 stores the read image of the page read by the image reading device 21 in the memory M1 (step S103).

Then, based on the settings in the image reading device 21, the CPU 220 determines whether there is a next page (step S104). If it is determined that there is a next page (YES at step S104), the CPU 220 performs the processes of step S101 and the subsequent steps on the next page. In this case, the immediately preceding page is the N-th page. Therefore, the next page is the first page, which follows the N-th page. Then, the first page becomes the immediately preceding page, and the second page following the first page becomes the next page.

If it is determined that there is no next page (NO at step S104), the CPU 220 performs an aggregation process of laying out the read images stored in the memory M1 on print sheets in bookbinding order (step S201).

If the memory full condition is determined during the reading of the next page (YES at step S102), the CPU 220 determines whether the image processing apparatus 2 is connectable to the external apparatus 3 via a network, for example (step S105).

If it is determined that the image processing apparatus 2 is not connectable to the external apparatus 3 (NO at step S105), the CPU 220 cancels the current job for executing the bookbinding printing (i.e., the copy job) (step S301), and retries the process of FIG. 7 from the beginning.

If it is determined that the image processing apparatus 2 is connectable to the external apparatus 3 (YES at step S105), the CPU 220 executes the following transfer process.

The CPU 220 first calculates the available print count X, i.e., the number of print sheets on which the image processing apparatus 2 is able to execute printing (step S106). For example, the available print count X corresponds to the whole number part of the value obtained by dividing the read page count K, i.e., the number of read images of pages stored in the memory M1 when the memory full condition is determined, by the number of pages to be laid out on one print sheet (four in the present example).

The CPU 220 then determines whether the available print count X is greater than 0 (step S107). If it is determined that the available print count X is 0 (NO at step S107), the CPU 220 transfers all read images stored in the memory M1 to the external apparatus 3 (step S108), and determines whether there is a next page to read (step S109). If it is determined that there is a next page to read (YES at step S109), the CPU 220 controls the image reading device 21 to read the image of the next page (step S110). The CPU 220 then stores the read image of the next page in the free space of the memory M1 (step S111), and transfers the thus-stored read image of the next page to the external apparatus 3 (step S112). If there is another next page, the CPU 220 repeats the processes of steps S110 to S112.

If there is no next page (NO at step S109), the CPU 220 instructs the external apparatus 3 to execute the aggregation process and the printing process (step S202).

If it is determined that the available print count X is greater than 0 (YES at step S107), the CPU 220 transfers the read images in the memory M1 to the external apparatus 3 in accordance with the above-described transfer rule based on the value of the available print count X (step S113). The CPU 220 then controls the image reading device 21 to read the image of the next page (step S114), and stores the read image of the next page in the free space of the memory M1 (step S115).

The CPU 220 further determines whether there is another next page to read (step S116). If it is determined that there is another next page to read (YES at step S116), the CPU 220 returns to step S113 to repeat the process of transferring the read images in the memory M1 to the external apparatus 3 in accordance with the above-described transfer rule.

If it is determined that there is no next page to read (NO at step S116), the CPU 220 causes the image processing apparatus 2 and the external apparatus 3 to perform the aggregation process (step S203). That is, the CPU 220 causes the image processing apparatus 2 to perform the aggregation process with the read images stored in the memory M1, and causes the external apparatus 3 to perform the aggregation process with the read images D transferred thereto.

After the aggregation process performed in the image processing apparatus 2 at step S201 or step S203, the CPU 220 determines whether there is any other factor preventing the copy job (e.g., running out of recording sheets or an apparatus-dependent factor) (step S204). If it is determined that there is a factor preventing the copy job (YES at step S204), the CPU 220 cancels the copy job (step S301).

If it is determined that there is no factor preventing the copy job (NO at step S204), the CPU 220 prints the aggregated images aggregated in the image processing apparatus 2 in bookbinding order (step S205). The transferred read images D, on the other hand, are aggregated and printed in bookbinding order in the external apparatus 3. If the print sheets printed in the image processing apparatus 2 are stacked upon the print sheets printed in the external apparatus 3, therefore, the combined print sheets are arranged in bookbinding order.

After the printing, if there is another booklet to copy, the CPU 220 returns to the beginning of the process of FIG. 7 to make a copy of the another booklet. If there is no booklet to copy, the CPU 220 completes the process of FIG. 7.

As a first modified example of the embodiment, in response to the occurrence of the memory full condition, a dialogue screen may be displayed to allow the user to specify a desired printing method. Specifically, a step of displaying a particular dialogue screen on the touch display 225 and receiving the selection of the printing method made by the user on the dialogue screen may be added to the process procedure of FIG. 7 as a step following the occurrence of the memory full condition (YES at step S102). For example, the dialogue screen may display options "cancel printing," "end reading and execute printing," and "continue reading by transferring the read images to the external apparatus" to allow the user to select one of the options. In response to selection of the option "cancel printing," the CPU 220 cancels the entire copy job (step S301). In response to selection of the option "end reading and execute printing," the CPU 220 aggregates the read images stored in the memory M1 (step S201) and prints the aggregated read images (step S205). In response to selection of the option "continue reading by transferring the read images to the external apparatus," the CPU 220 executes the processes of step S105 and the subsequent steps.

Figure 8:
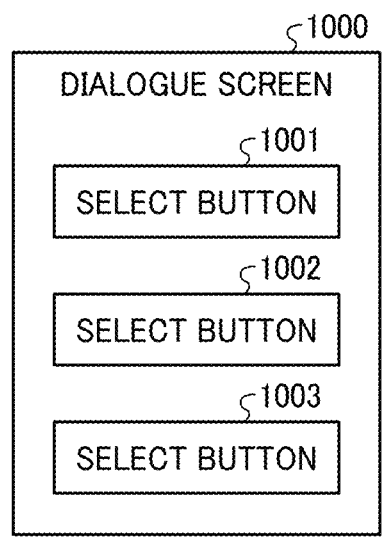
FIG. 8 is a diagram illustrating an example of a dialogue screen according to a first modified example of the embodiment.

FIG. 8 is a diagram illustrating an example of the dialogue screen of the first modified example. A dialogue screen 1000 includes a selection button 1001 for cancelling the printing, a selection button 1002 for ending the reading and executing the printing, and a selection button 1003 for continuing the reading by transferring the read images to the external apparatus 3. The user presses one of the selection buttons 1001 to 1003 to instruct the CPU 220 to follow the selected priming method.

With the selection screen thus displayed in response to the occurrence of the memory full condition, the user is able to decide and instruct the CPU 220 to cancel the copy job, print part of the read images and end the copy job, or continue the reading by using the external apparatus 3.

In the first modified example, the dialogue screen is displayed in response to the occurrence of the memory full condition to allow the user to specify the printing method. Alternatively, the embodiment may be modified to allow the user to select the printing method at an earlier stage.

For example, as a second modified example of the embodiment, the number of readable pages may be predicted from the remaining memory capacity after the reading of the first document. Then, the dialogue screen may be displayed to allow the user to select one of the options of cancelling the printing, ending the reading and executing the printing, and continuing the reading by transferring the read images to the external apparatus 3.

Figure 9:
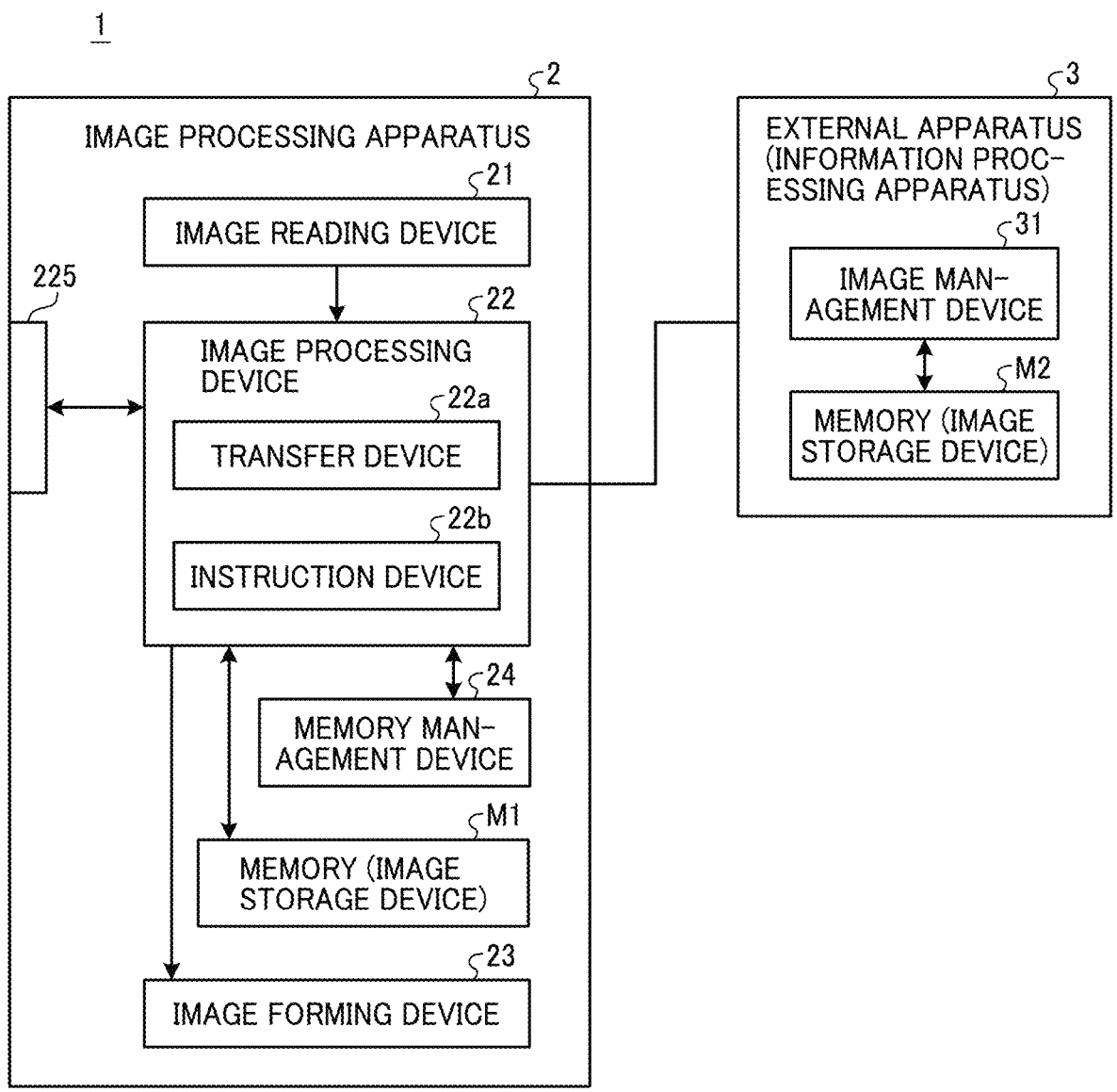
FIG. 9 is a diagram illustrating an example of the general arrangement of the image processing system according to a second modified example of the embodiment.

FIG. 9 is a diagram illustrating a configuration example of the second modified example. In the configuration illustrated in FIG. 9, the image processing device 22 also functions as a prediction device that predicts whether the read images of the pages of the booklet will be storable in the memory M1 by acquiring the remaining memory capacity from a memory management device 24 before and after the storage of the first read image into the memory M1. If it is predicted at this stage that the read images of the pages of the booklet will not be storable in the memory M1, the dialogue screen 1000 in FIG. 8 is displayed on the touch display 225 serving as the user interface, to thereby allow the user to select whether to continue the printing on the dialogue screen 1000.

As a third modified example of the embodiment, the image processing apparatus 2 may acquire from the external apparatus 3 the read images D previously transferred thereto and print the acquired read images D in bookbinding order. The image management device 31 of the external apparatus 3 is capable of acquiring the setting for bookbinding printing in the print settings received from the image processing apparatus 2. The external apparatus 3 is therefore capable of aggregating the read images D, which are transferred from the image processing apparatus 2 in reading order, in accordance with the same aggregation rule as that employed in the image processing apparatus 2, and transmitting the aggregated read images back to the image processing apparatus 2 in bookbinding order. The memory M1 in the image processing apparatus 2 has a limited capacity. After the printing executed by the image processing apparatus 2, therefore, the external apparatus 3 transmits to the image processing apparatus 2 the aggregated images, i.e., the read images arranged in bookbinding order for the X print sheets.

Figure 10:
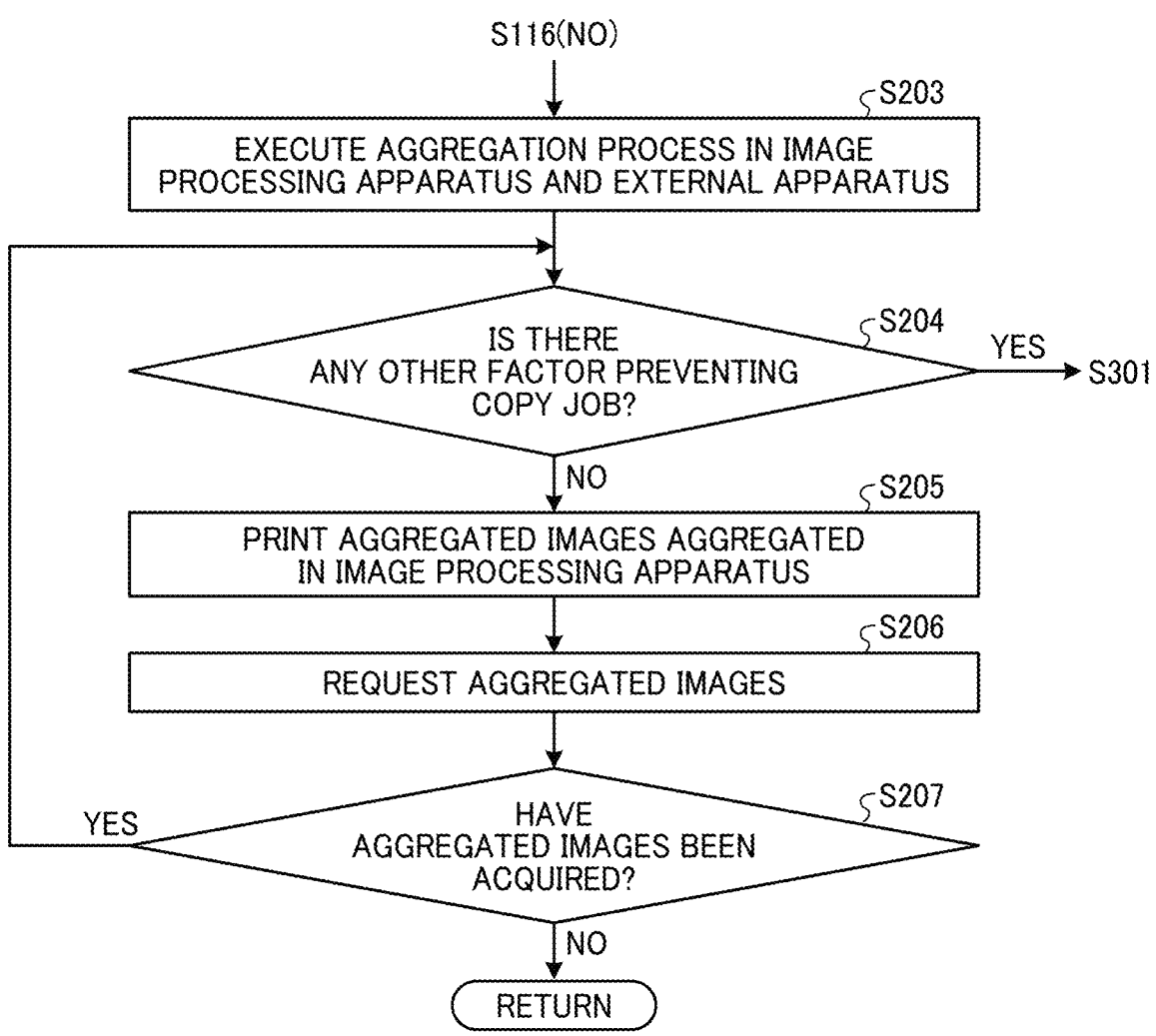
FIG. 10 is a flowchart illustrating an example of the process performed by the CPU of the image processing apparatus according to a third modified example of the embodiment.

FIG. 10 is a flowchart illustrating a procedure of the third modified example. FIG. 10 illustrates a procedure in which step S203 and the subsequent steps of the procedure in FIG. 7 are modified. The processes of steps S203 to S205 in FIG. 10 are similar to those described above with FIG. 7.

In the third modified example, after the process of step S205, the CPU 220 requests the external apparatus 3 to transmit the subsequent read images in bookbinding order (step S206). In response to receipt of a pair of subsequent read images from the external apparatus 3 (YES at step S207), the CPU 220 returns to step S204 and executes printing on a print sheet with the received pair of read images (i.e., aggregated images). Each time a pair of read images (i.e., aggregated images) is transmitted from the external apparatus 3 as a response to the request to the external apparatus 3, the CPU 220 executes printing of the received pair of aggregated images. If there is no further read images (i.e., aggregated images) transmitted from the external apparatus 3 (NO at step S207), the CPU 220 completes the process of FIG. 10.

As described above, the image processing apparatus 2 executes the printing of the read images on the X print sheets in bookbinding order, and then sequentially acquires the subsequent read images aggregated in the external apparatus 3. Thereby, the image processing apparatus 2 is also able to execute the printing of the subsequent read images in bookbinding order.

The processes executed in each of the embodiment and the modified examples may be provided as implemented by an ASIC or by a program executed by a computer. In the latter case, the program may be previously installed in a ROM or an HDD, for example, to be provided as functional units. In this case, a CPU reads the program and executes the program step by step to implement various functional units. Alternatively, the program may be recorded on a computer readable recording medium to be provided as a computer program product. For example, the program may be provided as recorded on a recording medium, such as a flexible disc, a compact disk-recordable (CD-R), a digital versatile disc (DVD), a Blu-ray Disc (registered trademark), or a semiconductor memory, in an installable or executable file format.

Further, the program may be stored in a computer connected to a network such as the Internet, and may be provided as downloaded from the computer via the network. Further, the program executed in each of the embodiment and the modified examples may be provided or distributed via a network such as the Internet.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An image processing apparatus comprising:
a memory configured to store a plurality of read images read by a reading device; and
processing circuitry configured to
store the read images read by the reading device sequentially in the memory,
transfer pairs of the read images from the memory to an external apparatus in ascending order of a bookbinding priority such that pairs of the read images remain stored in the memory in descending order of the bookbinding priority, and
instruct an image forming device to execute image formation with pairs of read images in descending order of the bookbinding priority
wherein a read image of the plurality of read images having a highest bookbinding priority indicates a first read image for printing.

2. The image processing apparatus of claim 1, further comprising an interface configured to communicate with the external apparatus,
wherein the processing circuitry is configured to
sequentially transfer the pairs of read images from the memory to the external apparatus via the interface in ascending order of the bookbinding priority,
acquire subsequent pairs of read images from the external apparatus via the interface in descending order of the bookbinding priority in response to execution of the image formation by the image forming device, and
instruct the image forming device to execute the image formation of the acquired subsequent pairs of read images in descending order of the bookbinding priority.

3. The image processing apparatus of claim 1, further comprising an interface configured to communicate with the external apparatus,
wherein the processing circuitry is configured to
sequentially transfer the pairs of read images from the memory to the external apparatus via the interface in ascending order of the bookbinding priority, and
instruct the external apparatus, via the interface, to execute image formation with the transferred pairs of read images in descending order of the bookbinding priority.

4. The image processing apparatus of claim 1, further comprising the reading device.

5. The image processing apparatus of claim 1, further comprising the image forming device.

6. The image processing apparatus of claim 1, wherein the processing circuitry is configured to
calculate an available print count from number of read images storable in the memory,
transfer the pairs of read images from the memory to the external apparatus in ascending order of the bookbinding priority in accordance with a transfer rule of leaving the pairs of read images in the memory in descending order of the bookbinding priority,
determine a number of the pairs of read images based on the available print count, and
hold the number of the pairs of read images in the memory in descending order of the bookbinding priority.

7. The image processing apparatus of claim 1, further comprising a user interface configured to receive print settings specified by a user,
wherein the processing circuitry is configured to
predict whether the memory will run out of space for storing read images to be used in a bookbinding printing operation, and
receive, via the user interface, a selection of a printing method made by the user from a plurality of options in response to a prediction that the memory will run out of the space for storing the read images to be used in the bookbinding printing operation.

8. The image processing apparatus of claim 1, wherein the processing circuitry is configured to determine to transfer the pairs of read images in response to determining that the memory cannot store all read images of a bookbinding operation.

9. The image processing apparatus of claim 1, wherein the processing circuitry is configured to determine the bookbinding priority based on an available print count.

10. The image processing apparatus of claim 9, wherein the processing circuitry is configured to determine the available print count based on a whole number obtained by dividing a number of pages storable in the memory by a number of pages to be laid out on one print sheet for the bookbinding.

11. The image processing apparatus of claim 9, wherein the processing circuitry is configured to transfer the pairs of read images from the memory to the external apparatus in response to determining that the available print count is greater than 0.

12. The image processing apparatus of claim 9, wherein the processing circuitry is configured to transfer all of the read images to the external apparatus in response to determining that the available print count is 0.

13. The image processing apparatus of claim 9, wherein the processing circuitry is configured to transfer a number of the pairs of read images from the memory to the external apparatus based on a value of the available print count.

14. An image processing method comprising:
sequentially storing, in a memory, a plurality of read images read by a reading device;
transferring pairs of the read images from the memory to an external apparatus in ascending order of a bookbinding priority;
after the transfer of a pair of the pairs of read images to the external apparatus, storing, in the memory, a subsequent read image read by the reading device; and
instructing an image forming device to execute image formation of the pairs of read images in descending order of the bookbinding priority,
wherein a read image of the plurality of read images having a highest bookbinding priority indicates a first read image for printing.

15. The image processing method according to claim 14, further comprising:
determining to transfer the pairs of read images in response to determining that the memory cannot store all read images of a bookbinding operation.

16. The image processing method according to claim 14, further comprising:

determining the bookbinding priority based on an available print count.

17. The image processing method according to claim 16, further comprising:
   determining the available print count based on a whole number obtained by dividing a number of pages storable in the memory by a number of pages to be laid out on one print sheet for the bookbinding.

18. The image processing method according to claim 16, further comprising:
   transferring a number of the pairs of read images from the memory to the external apparatus based on a value of the available print count.

19. A non-transitory recording medium storing a plurality of instructions which, when executed by one or more processors, cause the processors to perform an image processing method comprising:
   sequentially storing, in a memory, a plurality of read images read by a reading device;
   transferring pairs of the read images from the memory to an external apparatus in ascending order of a bookbinding priority;
   after the transfer of a pair of the pairs of read images to the external apparatus, storing, in the memory, a subsequent read image read by the reading device; and
   instructing an image forming device to execute image formation of the pairs of read images in descending order of the bookbinding priority,
   wherein a read image of the plurality of read images having a highest bookbinding priority indicates a first read image for printing.

20. The non-transitory recording medium of claim 19, the method further comprising:
   determining the bookbinding priority based on an available print count.

* * * * *